US009749664B1

(12) United States Patent
Watson et al.

(10) Patent No.: US 9,749,664 B1
(45) Date of Patent: Aug. 29, 2017

(54) METHODS AND SYSTEMS FOR PUBLIC ANNOUNCEMENTS ON A TRANSPORTATION VEHICLE

(71) Applicant: Panasonic Avionics Corporation, Lake Forest, CA (US)

(72) Inventors: Philip Watson, Lake Forest, CA (US); Changhwa Lin, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 15/170,738

(22) Filed: Jun. 1, 2016

(51) Int. Cl.
*H04N 21/2389* (2011.01)
*H04N 21/234* (2011.01)
*H04N 21/414* (2011.01)

(52) U.S. Cl.
CPC . *H04N 21/23424* (2013.01); *H04N 21/41407* (2013.01); *H04N 21/41422* (2013.01)

(58) Field of Classification Search
None
See application file for complete search history.

(56) References Cited

U.S. PATENT DOCUMENTS

| 7,068,795 | B2 | 6/2006 | Kennedy et al. | |
|---|---|---|---|---|
| 2002/0170064 | A1 | 11/2002 | Monroe et al. | |
| 2013/0063612 | A1* | 3/2013 | Royster | H04N 21/2146 348/207.99 |
| 2013/0159400 | A1* | 6/2013 | Fujii | G06F 1/1684 709/203 |
| 2014/0173669 | A1 | 6/2014 | Coto-Lopez | |
| 2015/0077516 | A1 | 3/2015 | Coto-Lopez | |
| 2015/0235540 | A1* | 8/2015 | Verna | H04W 4/12 340/539.11 |
| 2016/0050504 | A1 | 2/2016 | Browne | |
| 2016/0247383 | A1* | 8/2016 | Kassab | H04W 4/08 |
| 2016/0285542 | A1* | 9/2016 | Du | B64D 11/0015 |

FOREIGN PATENT DOCUMENTS

WO    WO 01/03437    1/2001

OTHER PUBLICATIONS

Fearnow, Benjamin, "New Apps Allow Smartphone Users to Live Broadcast Any Unfiltered Video Content", CBS Sacramento, Mar. 31, 2015.
"PaMic—Bluetooth PA system", https://play.google.com/store/apps/details?id=com.appiclife.pamic&hl=en, Aug. 31, 2014.

* cited by examiner

*Primary Examiner* — Justin Shepard
*Assistant Examiner* — Charles N Hicks
(74) *Attorney, Agent, or Firm* — Klein, O'Neill & Singh, LLP

(57) ABSTRACT

Methods and systems for a transportation vehicle are provided. For example, one method includes capturing a video for a public announcement at a transportation vehicle by an authorized device, where metadata of the video identifies the video for public announcement; transmitting the video to a distribution device that recognizes the video as being for public announcement; pausing distribution of any other video; selecting the video for public announcement; and distributing the video for public announcement to user devices at the transportation vehicle.

20 Claims, 8 Drawing Sheets

METHODS AND SYSTEMS FOR PUBLIC ANNOUNCEMENTS ON A TRANSPORTATION VEHICLE

TECHNICAL FIELD

The present disclosure relates to capturing and distributing public announcement videos on a transportation vehicle.

BACKGROUND

Transportation vehicles, for example, aircraft, trains, buses, recreation vehicle, boats and other similar vehicles use various computing devices for providing many functions, including playing entertainment content, control systems and others. These devices include hardware (for example, servers, switches, network interface cards, storage adapters, storage devices and others) and software (for example, server applications, operating systems, firmware, management applications, application programming interface (APIs) and others).

Conventional systems in transportation vehicles do not provide an efficient mechanism for making public announcements using live videos. Continuous efforts are being made to efficiently provide mechanisms for public announcements using videos on a transportation vehicle.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, methods and systems for a transportation vehicle are provided. For example, one method includes capturing a video for a public announcement on a transportation vehicle by an authorized device, where metadata of the video identifies the video for public announcement; transmitting the video to a distribution device that recognizes the video as being for public announcement; pausing distribution of any other video and/or audio; selecting the video for public announcement; and distributing the video for public announcement to user devices on the transportation vehicle.

Figure 1A:
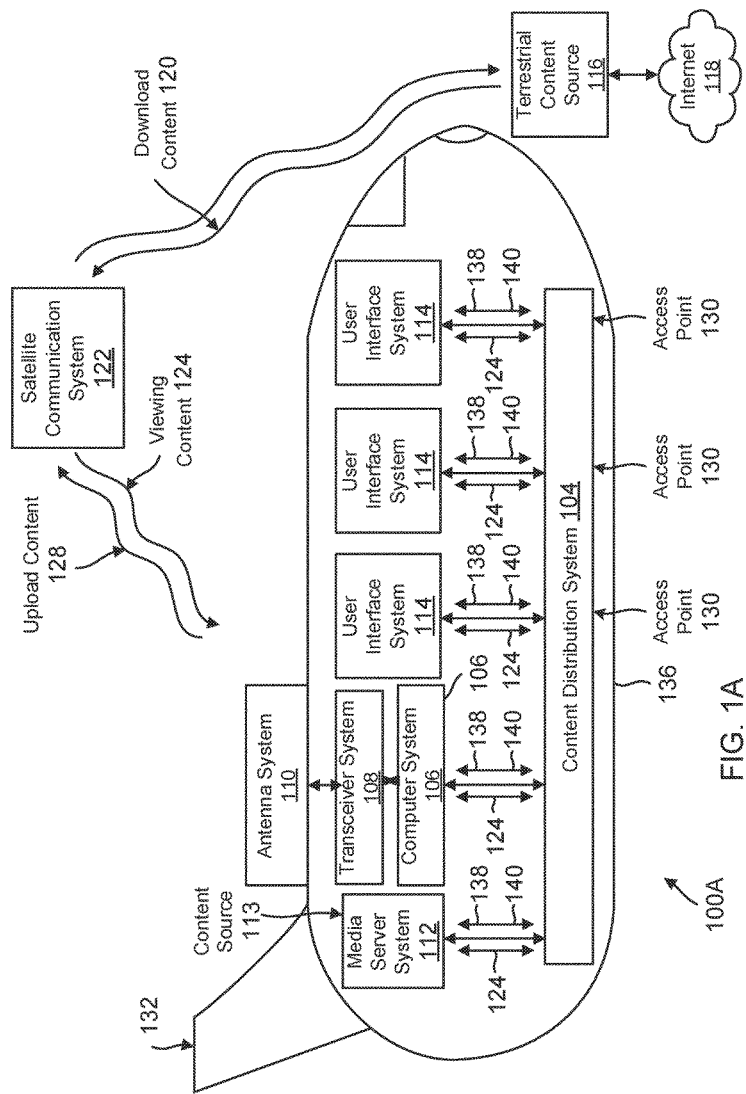
FIG. 1A shows an example of an operating environment for implementing the various aspects of the present disclosure in an aircraft.

Vehicle Information System:

FIG. 1A shows an example of a generic vehicle information system 100A (also referred to as system 100A) that can be configured for installation aboard an aircraft 132 for a video public announcement, according to one aspect of the present disclosure. System 100A can comprise a conventional aircraft passenger in-flight entertainment (IFE) system, such as the Series 2000, 3000, eFX, eX2, eXW, and/or any other in-flight entertainment system developed and provided by Panasonic Avionics Corporation (without derogation of any trademark rights of Panasonic Avionics Corporation) of Lake Forest, Calif.

System 100A may include a content source 113 and one or more user (or passenger) interface systems (may also be referred to as a setback device) 114 that communicate with a real-time content distribution system 104. The content sources 113 may include one or more internal content sources, such as a media server system 112, that are installed aboard the aircraft 132, one or more remote (or terrestrial) content source 116 that can be external from the aircraft 132, or a distributed content system. The media server system 112 can be provided as an information system controller for providing overall system control functions for system 100A and/or for storing viewing content 124, including pre-programmed viewing content and/or downloaded viewing content 120, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include a public announcement and two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive (download) viewing content 120 from a selected terrestrial content source 116 and/or transmit (upload) viewing content 128, including navigation and other control instructions, to the terrestrial content source 116.

As desired, the terrestrial content source 116 can be configured to communicate with other terrestrial content sources (not shown). Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114, as desired. Although shown and described as being separate systems for purposes of illustration, the computer system 106 and the media server system 112 can be at least partially or fully integrated.

The user interface system 114 may be computing terminals in communication with an access point 130. The user interface system 114 provides a display device, for example, a smart monitor, to view content. The user interface system 114 includes a hardware interface to connect to an access point 130 that provides a wired and/or a wireless connection for the user interface system. In at least one embodiment, the user interface system (also referred to as a seatback device) 114 comprises a software application that a user downloads and installs on a personal user device carried aboard by a user (a personal electronic device or "PED") to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, payment information likewise can be entered via the input system. The input system can be provided in any conventional manner and typically includes one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements.

Figure 1B:
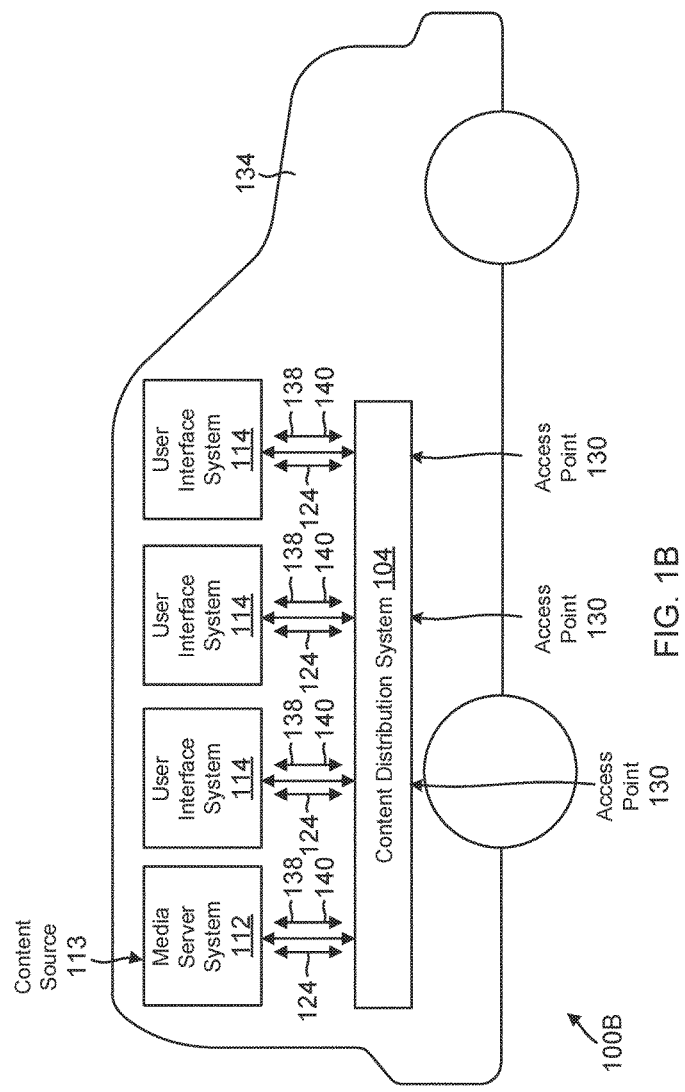
FIG. 1B shows an example of the operating environment on another transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
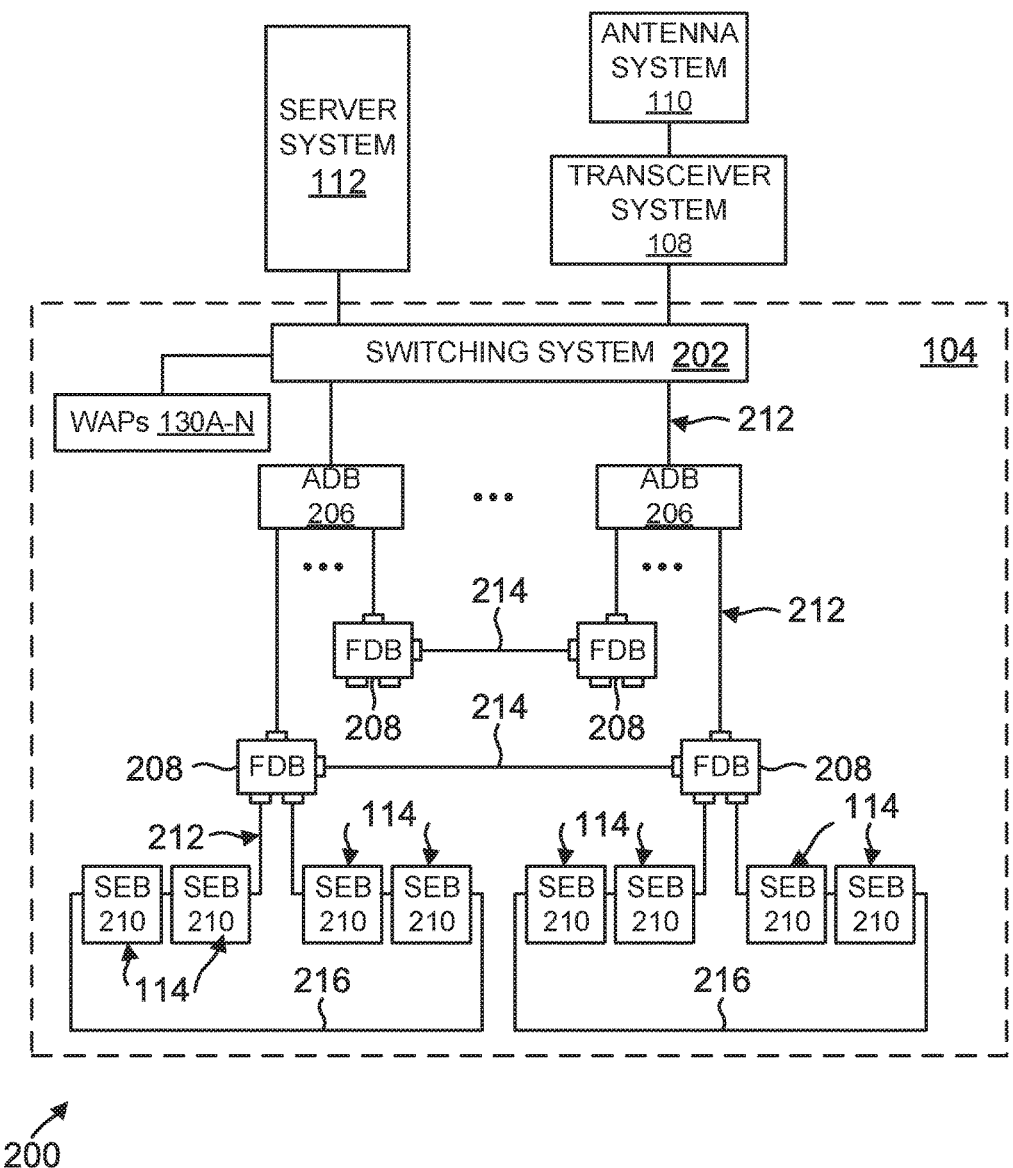
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

Figure 3A:
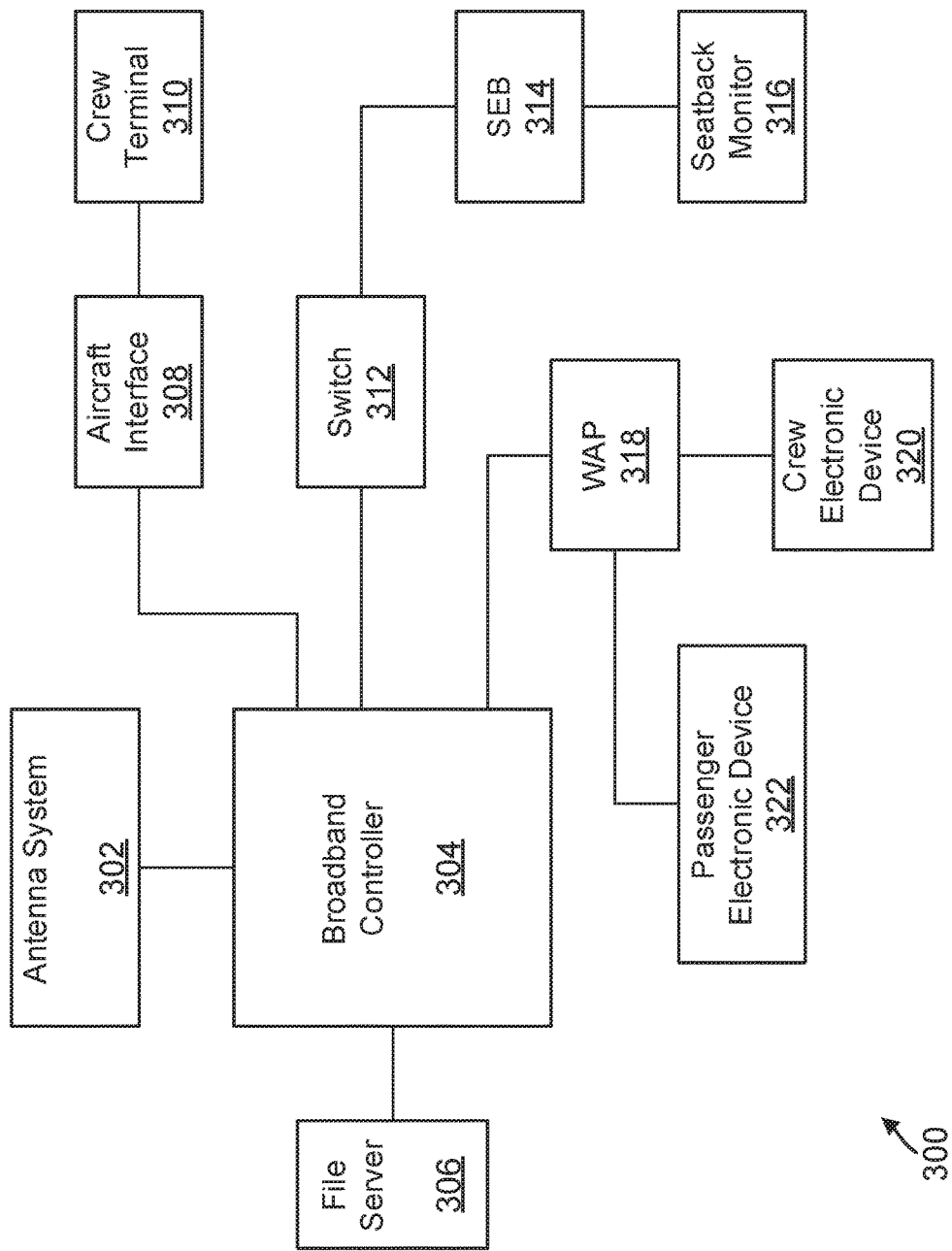
FIGS. 3A-3B show examples of a system for enabling video public announcements, according to one aspect of the present disclosure.

Video Public Announcement System:

FIG. 3A shows an example of a system 300 for a video based public address system at an aircraft, according to one aspect of the present disclosure. System 300 enables a crew member to capture a video using a crew member device and upload the video for a public announcement at the aircraft.

System 300 includes a broadband controller 304 that is coupled to an antenna system (similar to 110, FIG. 1A) that receives Ku-Band signals (downloaded content) from a satellite and converts them into L-band for distribution. The downloaded content is decrypted by a file server 306 (similar to, for example, the computer system 106, FIG. 1A) operationally coupled to the broadband controller 304. The file server 306 re-encrypts the downloaded content and the encrypted data is sent out as multicast packets to the seatback monitors 316 (maybe part of user interface 114, FIGS. 1A/1B) via a switch 312 (similar to, for example, the switch 202, FIG. 2).

The broadband controller 304 is operationally coupled to the switch 312 that maybe an Ethernet switch or any other switch type. The switch 312 is coupled to SEB 314 (similar to, fir example, SEB 210, FIG. 2) and the seatback monitor 316 to deliver content including videos for public announcements, as described below in detail.

In one aspect, the broadband controller 304 is also coupled to a WAP 318 (similar to, for example, WAP 130, FIG. 2) for providing wireless access to one or more crew electronic devices (CEDs) 320. A CED 320 may be a mobile device, laptop, notebook, tablet or any other device having programmable logic and a memory for executing the various aspects described herein. One or more passenger electronic device (PED) 322 is also coupled to WAP 318 for accessing content wirelessly. PED 322 may be a cell phone, laptop, notebook, tablet or any other mobile device. It is noteworthy that the CEDs and PEDs may be coupled to different WAPs but for convenience only a single WAP 318 is shown in FIG. 3A.

The broadband controller 304 may also be coupled to an airline interface 308 that is coupled to a crew terminal 310. The crew terminal 310 provides a management interface for configuring and managing the various components of system 300. For example, the crew terminal 310 may be used to configure a dedicated video PA channel that appears as a regular channel at the seatback monitor 316, described below in detail.

Figure 3B:
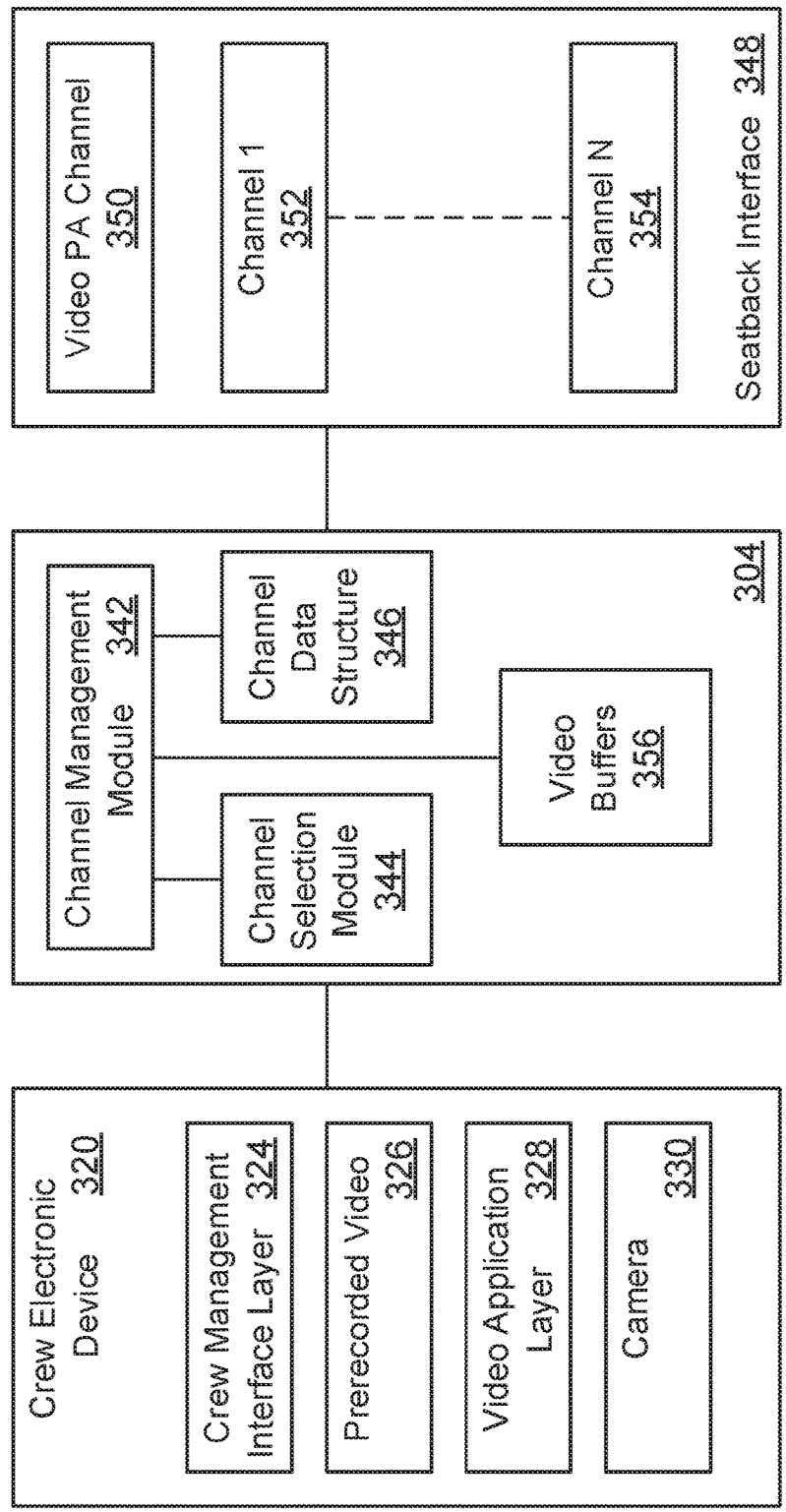

FIG. 3B shows detailed functional blocks of a system 349 that may be used to implement the various components of FIG. 3A, described above in detail. In one aspect, CED 320 includes a camera 330 that is configured to take a live video by an airline crew member. The video captured by the camera is processed by the video application layer 328 such that distributed video content meets airline/IFE system requirements, if any. In one aspect, the CED 320 may also use prerecorded video 326 for public announcements, such as by identifying or selecting a prerecorded video 326 stored on the CED 320 for transmission as a public announcement.

The CED 320 also includes a crew management interface (CMI) layer 324 that presents an interface, for example, a graphical user interface (GUI) to the airline crew for managing and configuring different components/sub-components of FIG. 3A. As an example, the GUI enables the crew member to upload a video for a public announcement. The video metadata indicates that the video is intended for a public announcement. In one aspect, a unique identifier is added to the video metadata that identifies the video as a public announcement. This may be implemented by the CMI layer 324 or the video application layer 328.

In one aspect, system 349 includes a channel management module 342 that is executed by a processor out of a memory. The channel management module 342 may be executed by the broadband controller 304 and/or the file server 306. In one aspect, the channel management module 342 uses video buffers 356 to buffer digital content that is distributed and displayed at seatback monitors 316 and/or PEDs 322. A channel data structure 346 stores metadata regarding different channels, for example, a channel identifier, channel name and other attributes. A channel selection module 344 may be used to select a channel and its associated data for distribution. In one aspect, the channel selection module 344 includes one or more multiplexers for selecting the appropriate channel to display content.

In yet another aspect, a video PA channel 350 appears as a dedicated channel at a seatback interface 348 to display videos as public announcements at the seatback monitor 316 and/or PDEs 322. Other video channels 352-354 are used to display other video content and are user selectable for example, by a touch screen or any other structure.

A crew member using CED 320 takes a video for public announcement. The video application layer 328 identifies the video for public announcement using a unique identifier. The CMI layer 324 transmits the video to the channel management module 342 that detects the video as a public announcement. In response to the detection, other active video channels are paused, i.e., buffered content for other channels is stalled.

The unicast video content from CED 320 is then modified into multicast packets and sent over to the SEB 314 by switch 312. The video may also be sent to the connected PEDs 322 for viewing. Details of using system 300 and 349 are provided below with respect to FIGS. 4A-4B.

Figure 4A:
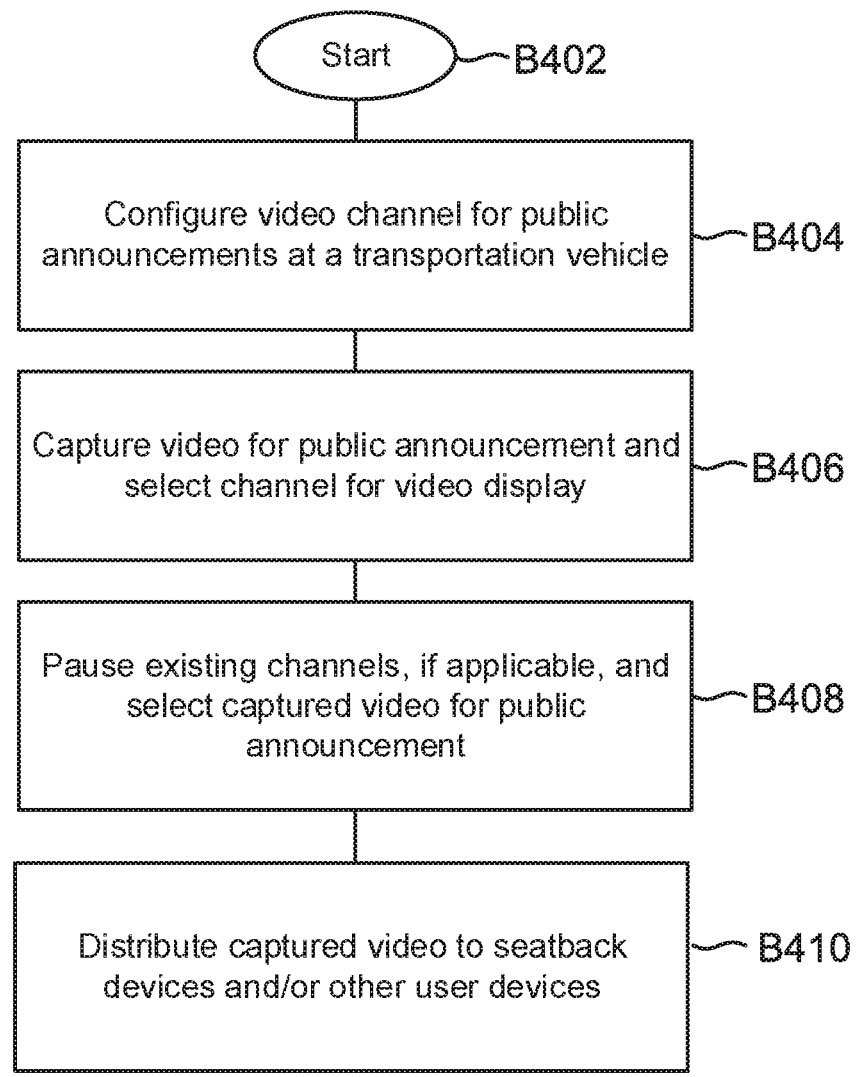
FIG. 4A shows a process flow for managing video public announcements, according to one aspect of the present disclosure.

Process Flow:

FIG. 4A shows a process 400 for enabling a CED 320 to capture a video for public announcement on a transportation vehicle, according to one aspect of the present disclosure. The process blocks are executed by a processor at one or more of the components of system 300/349.

The process begins in block B402, when the CED 320 and other components of system 300 are operational and initialized.

In block B404, a dedicated video channel 350 for public announcement is configured using CMI 324. The dedicated channel is identified by a unique identifier and metadata associated with the channel is stored at data structure 346. The stored metadata enables the channel management module 342 to select the video channel 350 when an authorized device attempts to make a public announcement, as described below.

In block B406, an authorized CED 320 captures a video for public announcement and provides it to the broadband controller 304 as unicast packets. Alternatively, the CED 320 is used to identify a previously recorded video on the CED for public announcement. Thu, either camera 330 captures the video or the prerecorded video is selected and the video application layer formats the video for transmission using the protocols/standards used by system 300. This includes formatting the video using encryption, where used, compression techniques, identifying the video for public announcement (for example, by associating the video with the video PA channel 350) and others. The adaptive aspects described herein are not limited to any specific format.

In block B408, the channel management module 342 that may be implemented at the broadband controller 304 and/or the file server 306 identifies the video as a public announcement. All existing video channels at user devices and seat monitors are paused. The video channel 350 is selected for display. The video received from the CED 320 as unicast packets are modified as multicast packets based on the various connected seatback monitors 316 and PEDs 322. A data structure identifying the various connected devices is maintained by broadband controller 304, WAP 318, switch 312 and/or other components of system 300. The various adaptive aspects described herein are not limited to any specific component maintaining the connection information. Thereafter, the video is presented to the seat monitors and the PEDs in block B410.

Figure 4B:
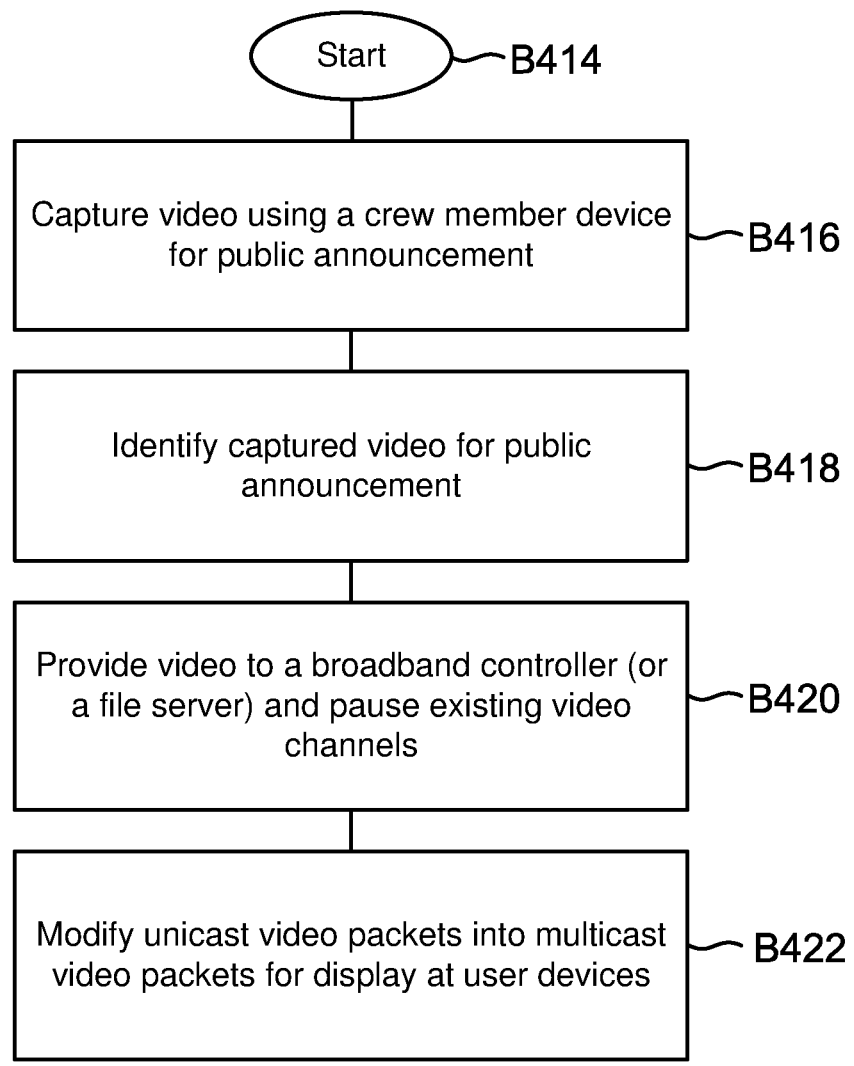
FIG. 4B show another process flow for managing video public announcements, according to one aspect of the present disclosure.

FIG. 4B shows a process 412 for displaying a video public announcement, according to one aspect of the present disclosure. The process begins in block B414, when the CED 320, seatback monitor 316 and if connected, PED 322 are operational and initialized. In block B416, a crew member captures a video using camera 330 at an authorized CED 320. The video is formatted for distribution and identified as a public announcement in block B418. In one aspect, the CMI 324 may be used to identify the video for public announcement by selecting video channel 350.

In block 420, the CED 320 sends the video to the broadband controller 304 as unicast packets. The broadband controller 304 identifies the video for public announcement and pauses all existing video displays at the seat back monitors and user devices that are connected. In another aspect, the file server 306 receives the unicast packets and distributes them as multicast packets. The adaptive aspects described herein are not limited to any specific component distributing the video content.

In block B422, the unicast video from the CED 322 is converted into multicast packets for distribution of the video to all the connected seatback devices and PEDs. The video captured by CED 320 is then displayed at the seatback monitors and the PEDs using switch 312.

The systems and methods described above enable a crew member at an aircraft or any other transportation vehicle to efficiently send videos for public announcements. This can be very helpful in an emergency situation for example, during a terrorist or hostage situation when a crew member can take a video and warn passengers.

Figure 5:
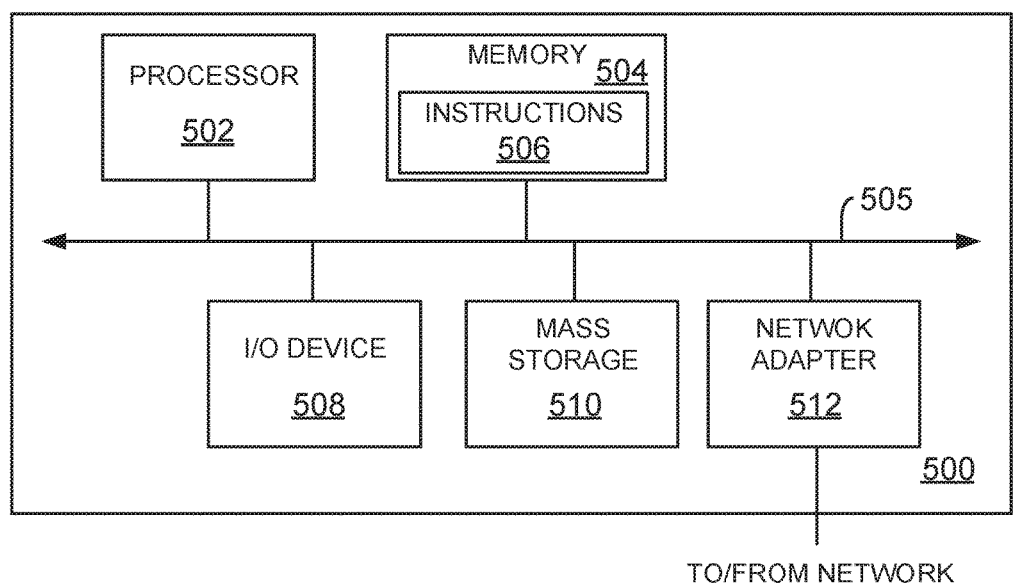
FIG. 5 shows an example of a hardware based, processing system, used according to one aspect of the present disclosure.

Processing System:

FIG. 5 is a high-level block diagram showing an example of the architecture of a processing system 500 that may be used according to one aspect. The processing system 500 can represent broadband controller 304, file server 306, aircraft interface 308, CED 320, computing systems 106 and/or 112, WAP 318 or PED 322 that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 4A-4B described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc.

For cost reduction, the crew terminal 310 typically does not include a camera. However, as technology continues to reduce the cost of information technology equipment, the crew terminal may include a camera, i.e., a fixed camera included with the IFE system or later installed, e.g., a camera that plugs into a port on the crew terminal. The camera may also be rotatable or mounted on a flexible neck and installed at locations other than the crew terminal. If the crew terminal is included with a camera, substantially the same or similar method and apparatus as described above may be used to distribute a public announcement video from the crew terminal. Likewise, the same could be done for seatback monitors 316 if supplied with cameras, i.e., a camera included with a monitor or later installed. Seatback monitors 316, however, would require authentication from a crew member, prior to permitting distribution of a video public announcement therefrom.

A method and apparatus for managing and distributing public announcement videos on a transportation vehicle have been described in the foregoing paragraphs. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
    capturing a live video for a public announcement on a transportation vehicle by a device;
    identifying, by the device, the live video using an identifier, the identifier indicating that the live video is for the public announcement;
    transmitting the live video to a distribution device that recognizes the video as being for public announcement based on the identifier assigned by the device;
    pausing distribution of any other video;
    selecting the live video for public announcement;
    identifying connected user devices at the transportation vehicle for receiving the live video;
    and
    distributing the live video for public announcement to the connected user devices at the transportation vehicle.

2. The method of claim 1, wherein the transportation vehicle is an aircraft.

3. The method of claim 2, wherein the live video is displayed at a seatback monitor using a dedicated video channel for public announcements.

4. The method of claim 3, wherein the dedicated video channel is enabled automatically when the aircraft is in flight.

5. The method of claim 2, wherein the live video is distributed to a passenger mobile device connected via a wireless access point on the aircraft.

6. The method of claim 1, wherein said device is a crew member mobile device used for capturing the live video.

7. The method of claim 1, wherein the device transmits the live video as one or more unicast packets and the distribution device distributes the live video as multicast packets to the connected user devices.

8. A non-transitory, machine readable medium having stored thereon instructions comprising machine executable code which when executed by a machine, causes the machine to:
    capture a live video for a public announcement on a vehicle by an authorized device;
    identify the live video by the authorized device with an identifier to indicate that the live video is for public announcement;
    transmit the live video to a distribution device that recognizes the video as being for public announcement based on the identifier;
    pause distribution of any other video;
    select the live video for public announcement; and
    distribute the live video for public announcement to connected user devices on the vehicle.

9. The non-transitory, machine readable medium of claim 8, wherein the vehicle is an aircraft.

10. The non-transitory, machine readable medium of claim 9, wherein the live video is displayed at a seatback monitor using a dedicated video channel for public announcements.

11. The non-transitory, machine readable medium of claim 10, wherein the dedicated video channel is enabled automatically when the aircraft is in flight.

12. The non-transitory, machine readable medium of claim 9, wherein the live video is distributed to a passenger mobile device connected via a wireless access point on the aircraft.

13. The non-transitory, machine readable medium of claim 8, wherein the authorized device is either a crew member mobile device used for capturing the live video or a fixed camera included with an entertainment system in the vehicle.

14. The non-transitory, machine readable medium of claim 8, wherein the vehicle is one or more of a train, a boat, a bus and a recreation vehicle.

15. A system, comprising:
- a memory containing machine readable medium comprising machine executable code having stored thereon instructions; and a processor module coupled to the memory, the processor module configured to execute the machine executable code to:
- capture a live video for a public announcement on a transportation vehicle by an authorized mobile device;
- identify the live video using an identifier indicating that the live video is for public announcement;
- transmit the live video to a distribution device that recognizes the video as being for public announcement based on the identifier;
- pause distribution of any other video;
- select the live video for public announcement; and
- distribute the live video for public announcement to connected user devices at the transportation vehicle.

16. The system of claim 15, wherein the live video is captured and streamed live by using a camera on the authorized device.

17. The system of claim 15, wherein the transportation vehicle is an aircraft and the live video is displayed on a seatback monitor on a dedicated video channel for public announcements.

18. The system of claim 17, wherein the dedicated video channel is enabled automatically when the aircraft is in flight.

19. The system of claim 16, wherein the live video is distributed to a passenger mobile device connected via a wireless access point.

20. The system of claim 15, wherein the authorized device is a crew member mobile device.

* * * * *